United States Patent
Ni et al.

(10) Patent No.: US 11,272,440 B2
(45) Date of Patent: *Mar. 8, 2022

(54) NETWORK SLICE SELECTION METHOD AND APPARATUS

(71) Applicant: Huawei Technologies Co., Ltd., Shenzhen (CN)

(72) Inventors: Hui Ni, Beijing (CN); Fang Yu, Beijing (CN); Yan Li, Beijing (CN); Xiaoqiang Qiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,199

(22) Filed: Feb. 26, 2020

(65) Prior Publication Data

US 2020/0267638 A1    Aug. 20, 2020

Related U.S. Application Data

(63) Continuation of application No. 16/282,014, filed on Feb. 21, 2019, now Pat. No. 10,602,438, which is a
(Continued)

(51) Int. Cl.
*H04W 48/18* (2009.01)
*H04W 76/11* (2018.01)
(Continued)

(52) U.S. Cl.
CPC ......... *H04W 48/18* (2013.01); *H04L 63/0876* (2013.01); *H04W 8/12* (2013.01);
(Continued)

(58) Field of Classification Search
CPC ......... H04W 8/18; H04W 76/11; H04W 8/12; H04W 84/00; H04W 84/042; H04W 8/02;
(Continued)

(56) References Cited

U.S. PATENT DOCUMENTS 8,971,295 B2    3/2015 Kuehnel
2013/0339495 A1    12/2013 Mower et al.
(Continued)

FOREIGN PATENT DOCUMENTS

CN    103209440 A    7/2013
CN    103298074 A    9/2013
(Continued)

OTHER PUBLICATIONS

"3rd Generation Partnership Project; Technical Specification Group Services and System Aspects; Study on Architecture for Next Generation System(Release 14)," 3GPP TR 23.799 V0.7.0 pp. 1-323, 3rd Generation Partnership Project, Valbonne, France (Aug. 2016).
(Continued)

*Primary Examiner* — Marcos L Torres
(74) *Attorney, Agent, or Firm* — Leydig, Voit & Mayer, Ltd.

(57) ABSTRACT

A network slice selection method and apparatus are disclosed. The method includes: receiving, by a first SSF device of a VPLMN, a first service request message; obtaining, by the first SSF device, roaming information of UE according to the first service request message; selecting, by the first SSF device, a first network slice instance in the VPLMN for the UE based on the roaming information of the UE.

18 Claims, 7 Drawing Sheets

Related U.S. Application Data continuation of application No. PCT/CN2016/096289, filed on Aug. 22, 2016.

(51) Int. Cl.
| | |
|---|---|
| *H04L 29/06* | (2006.01) |
| *H04W 8/12* | (2009.01) |
| *H04W 84/00* | (2009.01) |
| *H04W 84/04* | (2009.01) |

(52) U.S. Cl.
CPC ............ *H04W 76/11* (2018.02); *H04W 84/00* (2013.01); *H04W 84/042* (2013.01)

(58) Field of Classification Search
CPC .... H04W 60/00; H04W 48/18; H04L 63/0876
See application file for complete search history.

(56) References Cited

U.S. PATENT DOCUMENTS

| | | | |
|---|---|---|---|
| 2014/0372617 | A1 | 12/2014 | Houyou et al. |
| 2015/0131612 | A1 | 5/2015 | Elliott |
| 2015/0358857 | A1 | 12/2015 | Duan et al. |
| 2018/0262980 | A1 | 9/2018 | Jeong et al. |
| 2019/0020996 | A1* | 1/2019 | Zhang ..................... H04W 8/12 |
| 2019/0021047 | A1* | 1/2019 | Zong ..................... H04W 48/00 |

FOREIGN PATENT DOCUMENTS

| | | |
|---|---|---|
| CN | 104081719 A | 10/2014 |
| WO | 2017086647 A1 | 5/2017 |
| WO | 2017113100 A1 | 7/2017 |

OTHER PUBLICATIONS

"3rd Generation Partnership Project; Technical Specification Group Radio Access Network; Evolved Universal Terrestrial Radio Access (E-UTRA); Multiplexing and channel coding(Release 13)," 3GPP TS 36.212 V13.0.0, pp. 1-121, 3rd Generation Partnership Project, Valbonne, France (Dec. 2015).

"3rd Generation Partnership Project; Technical Specification Group Radio Access Network; Evolved Universal Terrestrial Radio Access (E-UTRA); Physical layer procedures(Release 13)," 3GPP TS 36.213 V13.0.0, pp. 1-326, 3rd Generation Partnership Project, Valbonne, France (Dec. 2015).

"3rd Generation Partnership Project; Technical Specification Group Radio Access Network; Evolved Universal Terrestrial Radio Access (E-UTRA); Medium Access Control (MAC) protocol specification(Release 13)," 3GPP TS 36.321 V13.0.0, pp. 1-82, (Dec. 2015), 3rd Generation Partnership Project, Valbonne, France (Dec. 2015).

"3rd Generation Partnership Project; Technical Specification Group Services and System Aspects; Study on Architecture for Next Generation System(Release 14)," 3GPP TR 23.799 V0.7.0, XP05117236, pp. 1-323, 3rd Generation Partnership Project, Valbonne, France (Aug. 2016).

"Key principles for Support of Network Slicing in RAN," RAN WG2 Meeting #95, Gothenburg, Sweden, R2-165019, XP051134101 (Aug. 22-26, 2016).

"Network Slice Selection considering Authentication and Authorization," SA WG2 Meeting #116, Vienna, Austria, S2-163395, pp. 1-6, 3rd Generation Partnership Project, Valbonne, France (Jul. 11-15, 2016).

"Network Slice selection in roaming scenario," SA WG2 Meeting #116BIS, Sanya, China, S2-164512 (revision of S2-16xxxx), pp. 1-7, 3rd Generation Partnership Project, Valbonne, France (Aug. 29-Sep. 2, 2016).

"Update of work task for network slicing," SA WG2 Meeting #116, Vienna, Austria, S2-163974, pp. 1-2, 3rd Generation Partnership Project, Valbonne, France (Jul. 11-15, 2016).

"Update of Network Slicing Solution 1.3," SA WG2 Meeting #116, Vienna, Austria, S2-163982, pp. 1-12, 3rd Generation Partnership Project, Valbonne, France (Jul. 11-15, 2016).

"Supporting network slicing in roaming scenario," SA WG2 Meeting #116BIS, Sanya, China, S2-164511, pp. 1-6, 3rd Generation Partnership Project, Valbonne, France (Aug. 29-Sep. 2, 2016).

"3rd Generation Partnership Project; Technical Specification Group Services and System Aspects; Vocabulary for 3GPP Specifications (Release 13)," 3GPP TR 21.905 V13.1.0, pp. 1-65, 3rd Generation Partnership Project, Valbonne, France (Jun. 2016).

"3rd Generation Partnership Project; Technical Specification Group Core Network and Terminals; Numbering, addressing and identification (Release 14)," 3GPP TS 23.003 V14.0.0, pp. 1-102, 3rd Generation Partnership Project, Valbonne, France (Jun. 2016).

* cited by examiner

NETWORK SLICE SELECTION METHOD AND APPARATUS

CROSS-REFERENCE TO RELATED APPLICATIONS

This application is a continuation of U.S. application Ser. No. 16/282,014, filed on Feb. 21, 2019, which is a continuation of International Patent Application No. PCT/CN2016/096289, filed on Aug. 22, 2016. All of the afore-mentioned patent applications are hereby incorporated by reference in their entireties.

TECHNICAL FIELD

The present disclosure relates to the field of communications technologies, and in particular, to a network slice selection method and apparatus.

BACKGROUND

A network slice technology divides a physical network into a plurality of network slice instances. In each network slice instance, a network function is customized and tailored and a corresponding network function is orchestrated and managed based on a service scenario requirement. A network and management are customized, so that a customized requirement of each service of a consumer and an enterprise is better satisfied, and a plurality of services are implemented relatively independently while the services share one broadband network infrastructure. The customized requirement includes coverage, duration, a capacity, a speed, a delay, reliability, security, availability, and the like. Each network slice instance may be considered as a core network architecture. A network slice instance may be applied to mobile broadband, multimedia, massive machine type communication, and critical machine type communication.

In the prior art, in a same public land mobile network (PLMN), a user equipment (UE) may access only one network slice instance, or may access a plurality of network slice instances and simultaneously use different services provided by the plurality of network slice instances. In a home routed roaming scenario, when UE roams to a visited public land mobile network (VPLMN), a service requested by the UE needs to be jointly provided by the VPLMN and a home public land mobile network (HPLMN). In a scenario in which a network slice technology is supported, the service requested by the UE needs to be jointly provided by two slice instances of the VPLMN and the HPLMN.

In the scenario in which the UE roams and the network slice technology is supported, a network slice selection method needs to be provided, so that the two PLMNs can select proper network slice instances to provide the service to the UE, and user experience of the roaming UE is ensured in the scenario in which the network slice technology is supported.

SUMMARY

Embodiments of the present disclosure provide a network slice selection method and apparatus, to resolve a problem that in a scenario in which UE roams, a service requested by the UE needs to be provided by proper network slices jointly selected by a VPLMN and an HPLMN.

According to a first aspect, an embodiment of the present disclosure provides a network slice selection method. The method includes:

receiving, by a first slice selection function (SSF) device of a VPLMN, a first service request message sent by UE; obtaining, by the first SSF device, roaming information of user equipment UE according to the first service request message; and selecting a first network slice instance in the VPLMN for the UE based on the roaming information of the UE.

In a possible design, after the selecting a first network slice instance in the VPLMN for the UE based on the roaming information of the UE, the method further includes:

sending, by the first SSF device, a network slice selection request to a second SSF device of an HPLMN, and receiving, by the first SSF device, a slice selection response message sent by the second SSF device, where the network slice selection request is used to request the second SSF device of the HPLMN to select a second network slice instance in the HPLMN for the UE, the slice selection response message includes information about the second network slice instance selected in the HPLMN for the UE by the second SSF device, and the information about the second network slice instance is used to instruct a first SM function in the first network slice instance to address a second SM function and interact with the second SM function to establish a session connection.

In this embodiment of the present disclosure, the first SSF device selects the first network slice instance in the VPLMN for the UE, the second SSF device selects the second network slice instance in the HPLMN for the UE, and the first network slice instance and the second network slice instance jointly provide a service for the UE.

In a possible design, before the receiving, by a first SSF device of a VPLMN, a first service request message sent by UE, the method further includes: receiving, by the first SSF device, an attach request of the UE, querying, by the first SSF device, subscription information of the UE from a user subscription database of the HPLMN of the UE based on an international mobile subscriber identity (IMSI) of the UE, determining, by the first SSF device based on the subscription information, information carried in the attach request, and an HPLMN ID or indication information indicating that the UE is a roaming subscriber, a mobility management MM function required by the UE, and sending, by the first SSF device, an attach request message to the MM function.

In a possible design, the roaming information of the UE includes: the indication information indicating that the UE is a roaming subscriber, and/or the home public land mobile network identifier HPLMN ID of the UE.

In a possible design, after receiving the first service request message, the first SSF device determines a slice type of the first network slice instance in the VPLMN for the UE based on the roaming information of the UE. In a possible design, after receiving the first service request message, the first SSF device determines the first network slice instance in the VPLMN for the UE based on the roaming information of the UE; or determines the first network slice instance and a network function in the first network slice instance in the VPLMN for the UE based on the roaming information of the UE.

In this embodiment of the present disclosure, the first network slice instance is in a specified correspondence with the network function in the first network slice instance.

In a possible design, the network function in the first network slice instance includes: a mobility management (MM) function and/or a first session management (SM) function.

In a possible design, the network slice selection request includes: the slice type of the first network slice instance.

In a possible design, the network slice selection request further includes: a visited public land mobile network identifier VPLMN ID.

In a possible design, the information about the second network slice instance includes: a slice type of the second network slice instance and/or an ID of the second network slice instance and/or an identifier of the second SM function of the second network slice instance.

According to a second aspect, an embodiment of the present disclosure provides a network slice selection method. The method includes:

receiving, by a second SSF device of an HPLMN, a network slice selection request; after receiving the network slice selection request, selecting, by the second SSF device, a second network slice instance in the HPLMN for the UE based on information about a visited network of the UE; and sending, by the second SSF device, a slice selection response message, where the slice selection response message includes information about the second network slice instance selected in the HPLMN for the UE by the second SSF device.

In a possible design, the network slice selection request received by the second SSF device of the HPLMN is sent by a first SSF device of a VPLMN.

In a possible design, the network slice selection request received by the second SSF device of the HPLMN is sent by a first SM function in a first network slice instance of a VPLMN.

In a possible design, the second SSF device sends the slice selection response message to the first SSF device of the VPLMN.

In a possible design, the second SSF device sends the slice selection response message to the first SM of the VPLMN.

In a possible design, after receiving the network slice selection request, the second SSF device determines a slice type of the second network slice instance in the HPLMN for the UE based on the information about the visited network of the user equipment UE.

In a possible design, after receiving the network slice selection request, the second SSF device determines the second network slice instance in the HPLMN for the UE based on the information about the visited network of the user equipment UE; or determines the second network slice instance and a network function in the second network slice instance for the UE based on the information about the visited network of the user equipment UE.

In a possible design, the information about the visited network includes: a slice type of the first network slice instance and/or a visited public land mobile network identifier VPLMN ID.

In a possible design, the network function in the second network slice instance includes: a second session management SM function.

In a possible design, the information about the second network slice instance includes: a slice type of the second network slice instance and/or an ID of the second network slice instance and/or an identifier of a second SM function of the second network slice instance, and the information about the second network slice instance is used to instruct the first SM function in the first network slice instance to address the second SM function in the second network slice instance and interact with the second SM function to establish a session connection.

According to a third aspect, an embodiment of the present disclosure provides a network slice selection method. The method includes:

receiving, by a first SM function of a VPLMN, a second service request message; after receiving the second service request message, sending, by the first SM, a network slice selection request to a second SSF device of an HPLMN; and receiving, by the first SM, a slice selection response message sent by the second SSF device, where the second service request message is used to request a first service and instruct the first SM function to establish a session connection for the first service, the network slice selection request is used to instruct the second SSF device of the HPLMN to select a second network slice instance in the HPLMN for user equipment UE, and the slice selection response message includes information about the second network slice instance selected in the HPLMN by the second SSF device.

In a possible design, the network slice selection request includes: a slice type of a first network slice instance.

In a possible design, the network slice selection request further includes: a VPLMN ID.

In a possible design, the network slice selection request further includes: an ID of the first network slice instance and/or an identifier of the first SM function in the first network slice instance, and the ID of the first network slice instance and/or the identifier of the first SM function in the first network slice instance is used to instruct a second SM function in the second network slice instance to address the first SM function and interact with the first SM function to establish a session connection.

According to a fourth aspect, an embodiment of the present disclosure provides a network slice instance selection apparatus. The apparatus includes: a first receiving unit, configured to receive a first service request message sent by UE; and a first processing unit, configured to: obtain roaming information of user equipment UE according to the first service request message received by the first receiving unit, and select a first network slice instance in a VPLMN for the UE based on the roaming information of the UE.

In a possible design, the apparatus further includes a first sending unit. The first sending unit is configured to send a network slice selection request to a second SSF device of an HPLMN. Then, the first receiving unit is further configured to receive a slice selection response message sent by the second SSF device. The network slice selection request is used to request the second SSF device of the HPLMN to select a second network slice instance in the HPLMN for the UE, the slice selection response message includes information about the second network slice instance selected in the HPLMN for the UE by the second SSF device, and the information about the second network slice instance is used to instruct a first SM function in the first network slice instance to address a second SM function and interact with the second SM function to establish a session connection.

In this embodiment of the present disclosure, the first receiving unit, the first processing unit, and the first sending unit belong to a first SSF device of the VPLMN. The first SSF device selects the first network slice instance in the VPLMN for the UE, the second SSF device selects the second network slice instance in the HPLMN for the UE, and the first network slice instance and the second network slice instance jointly provide a service for the UE.

In a possible design, before receiving the first service request message sent by the UE, the first receiving unit receives an attach request of the UE; the first processing unit queries subscription information of the UE from a user subscription database of the HPLMN of the UE based on an international mobile subscriber identity of the UE; and determines, based on the subscription information, information carried in the attach request, and an HPLMN ID or indication information indicating that the UE is a roaming subscriber, a mobility management MM function required by the UE; and the first sending unit sends an attach request message to the MM function.

In a possible design, the roaming information of the UE includes: the indication information indicating that the UE is a roaming subscriber, and/or the home public land mobile network identifier HPLMN ID of the UE.

In a possible design, after the first receiving unit receives the first service request message, the first processing unit determines a slice type of the first network slice instance in the VPLMN for the UE based on the roaming information of the UE.

In a possible design, after the first receiving unit receives the first service request message, the first processing unit determines the first network slice instance in the VPLMN for the UE based on the roaming information of the UE; or determines the first network slice instance and a network function in the first network slice instance in the VPLMN for the UE based on the roaming information of the UE.

In this embodiment of the present disclosure, the first network slice instance is in a specified correspondence with the network function in the first network slice instance.

In a possible design, the network function in the first network slice instance includes: a mobility management MM function and/or a first session management SM function.

In a possible design, the network slice selection request includes: the slice type of the first network slice instance.

In a possible design, the network slice selection request further includes: a visited public land mobile network identifier VPLMN ID.

In a possible design, the information about the second network slice instance includes: a slice type of the second network slice instance and/or an ID of the second network slice instance and/or an identifier of the second SM function of the second network slice instance.

According to a fifth aspect, an embodiment of the present disclosure provides a network slice selection apparatus. The apparatus includes: a second receiving unit, configured to receive a network slice selection request; a second processing unit, configured to: after the second receiving unit receives the network slice selection request, select a second network slice instance in an HPLMN for the UE based on information about a visited network of the UE; and a second sending unit, configured to send a slice selection response message, where the slice selection response message includes information about the second network slice instance selected in the HPLMN for the UE by a second SSF device.

In this embodiment of the present disclosure, the second receiving unit, the second processing unit, and the second sending unit belong to the second SSF device of the HPLMN.

In a possible design, the network slice selection request received by the second receiving unit is sent by a first SSF device of a VPLMN.

In a possible design, the network slice selection request received by the second receiving unit is sent by a first SM function in a first network slice instance of a VPLMN.

In a possible design, the second sending unit sends the slice selection response message to the first SSF device of the VPLMN.

In a possible design, the second sending unit sends the slice selection response message to the first SM of the VPLMN.

In a possible design, after the second receiving unit receives the network slice selection request, the second processing unit determines a slice type of the second network slice instance in the HPLMN for the UE based on the information about the visited network of the user equipment UE.

In a possible design, after the second receiving unit receives the network slice selection request, the second processing unit determines the second network slice instance in the HPLMN for the UE based on the information about the visited network of the user equipment UE; or determines the first network slice instance and a network function in the second network slice instance in the VPLMN for the UE based on roaming information of the UE.

In a possible design, the information about the visited network includes: a slice type of the first network slice instance and/or a visited public land mobile network identifier VPLMN ID.

In a possible design, the network function in the second network slice instance includes: a second session management SM function.

In a possible design, the information about the second network slice instance includes: a slice type of the second network slice instance and/or an ID of the second network slice instance and/or an identifier of a second SM function of the second network slice instance, and the information about the second network slice instance is used to instruct the first SM function in the first network slice instance to address the second SM function in the second network slice instance and interact with the second SM function to establish a session connection.

According to a sixth aspect, an embodiment of the present disclosure provides a network slice instance selection apparatus. The apparatus includes: a third receiving unit, configured to receive a second service request message, and a third sending unit, configured to: after the third receiving unit receives the second service request message, send a network slice selection request to a second SSF device of an HPLMN. Then, the third receiving unit receives a slice selection response message sent by the second SSF device. The second service request message is used to request a first service and instruct the first SM function to establish a session connection for the first service, the network slice selection request is used to instruct the second SSF device of the HPLMN to select a second network slice instance in the HPLMN for user equipment UE, and the slice selection response message includes information about the second network slice instance selected in the HPLMN by the second SSF device.

In this embodiment of the present disclosure, the third receiving unit, the third processing unit, and the third sending unit belong to a first SM device of the VPLMN.

In a possible design, the network slice selection request includes: a slice type of a first network slice instance.

In a possible design, the network slice selection request further includes: a VPLMN ID.

In a possible design, the network slice selection request further includes: an ID of the first network slice instance and/or an identifier of the first SM function in the first network slice instance, and the ID of the first network slice instance and/or the identifier of the first SM function in the first network slice instance is used to instruct a second SM function in the second network slice instance to address the first SM function and interact with the first SM function to establish a session connection.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
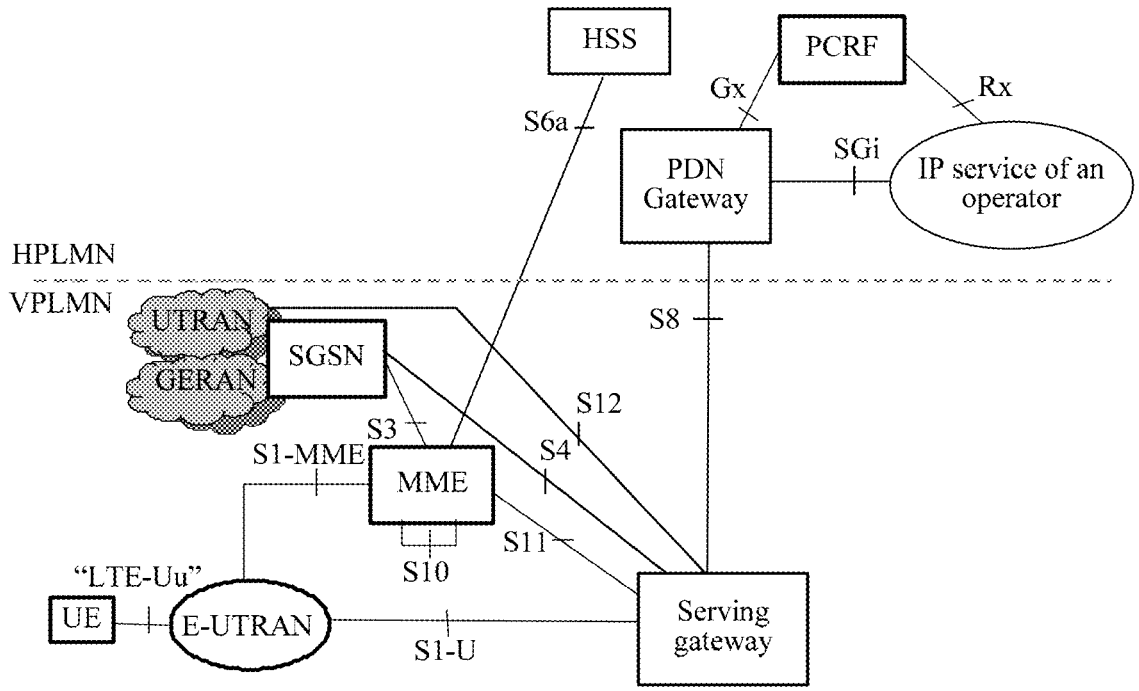
FIG. 1 is a schematic diagram of a home routed roaming architecture according to an embodiment of the present disclosure.

As shown in FIG. 1, user equipment UE accesses an evolved packet core (EPC) network by using an evolved universal terrestrial radio access network (E-UTRAN). In a home routed roaming architecture of EPC, UE establishes an S8 bearer between an S-GW network element of a VPLMN and a PDN gateway (P-GW) of an HPLMN by using a serving gateway (S-GW) of the VPLMN, and the P-GW of the HPLMN establishes a connection to an external PDN.

The user equipment UE described in this application may include various handheld devices, in-vehicle devices, wearable devices, and computing devices having a wireless communication function, other processing devices connected to a wireless modem, and UE in various forms. A SSF is configured to select a network slice instance in an HPLMN and a VPLMN. A MM function indicates a function that can be implemented by a network slice instance in the HPLMN and the VPLMN. A first SM function is configured to establish a session connection between a network slice instance of the HPLMN and a network slice instance of the VPLMN. For ease of description, in this application, the devices mentioned above are all referred to as user equipment or UE.

Figure 2:
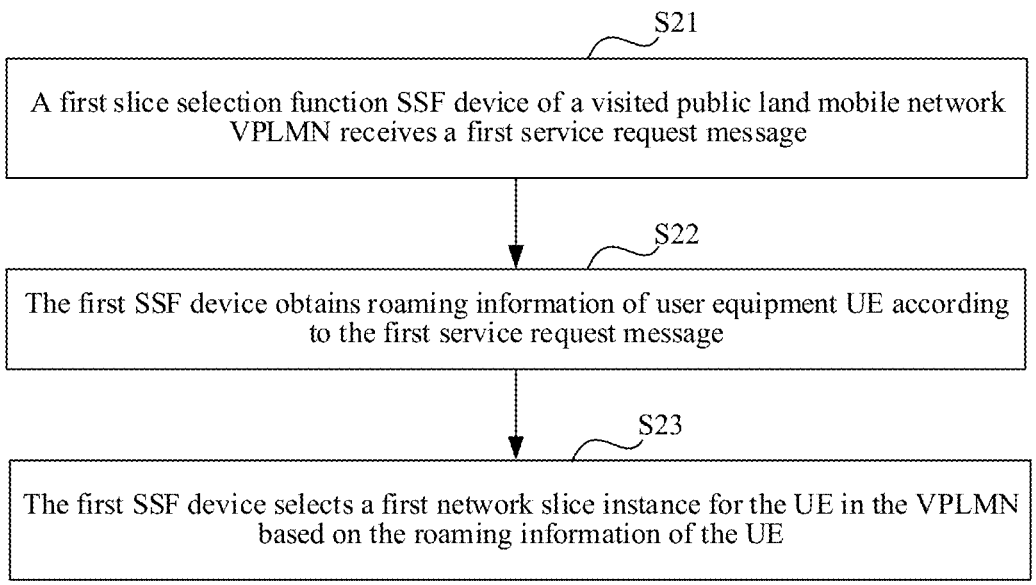
FIG. 2 is a schematic flowchart of a network slice instance selection method according to an embodiment of the present disclosure.

An embodiment of the present disclosure provides a network slice instance selection method. As shown in FIG. 2, the method includes the following process:

S21. A first SSF device of a VPLMN receives a first service request message.

S22. The first SSF device obtains roaming information of user equipment UE according to the first service request message.

S23. The first SSF device selects a first network slice instance in the VPLMN for the UE based on the roaming information of the UE.

In this embodiment of the present disclosure, after step S23, the method further includes: sending, by the first SSF device, a network slice selection request to a second SSF device of an HPLMN, where the network slice selection request is used to request the second SSF device of the HPLMN to select a second network slice instance in the HPLMN for the UE, and receiving, by the first SSF device, a slice selection response message sent by the second SSF device, where the slice selection response message includes information about the second network slice instance selected in the HPLMN for the UE by the second SSF device, and the information about the second network slice instance is used to instruct a first SM function in the first network slice instance to address a second SM function and interact with the second SM function to establish a session connection.

In this embodiment of the present disclosure, after step S23, the method further includes: forwarding, by the first SSF device, a service request message to an MM function in the first network slice instance, so that the MM function triggers the first SM function in the first network slice instance to send the network slice selection request to the second SSF device of the HPLMN. The network slice selection request is used to request the second SSF device of the HPLMN to select a second network slice instance in the HPLMN for the UE.

In this embodiment of the present disclosure, the first SSF device selects the first network slice instance in the VPLMN for the UE, the second SSF device selects the second network slice instance in the HPLMN for the UE, and the first network slice instance and the second network slice instance jointly provide a service for the UE.

Figure 3:
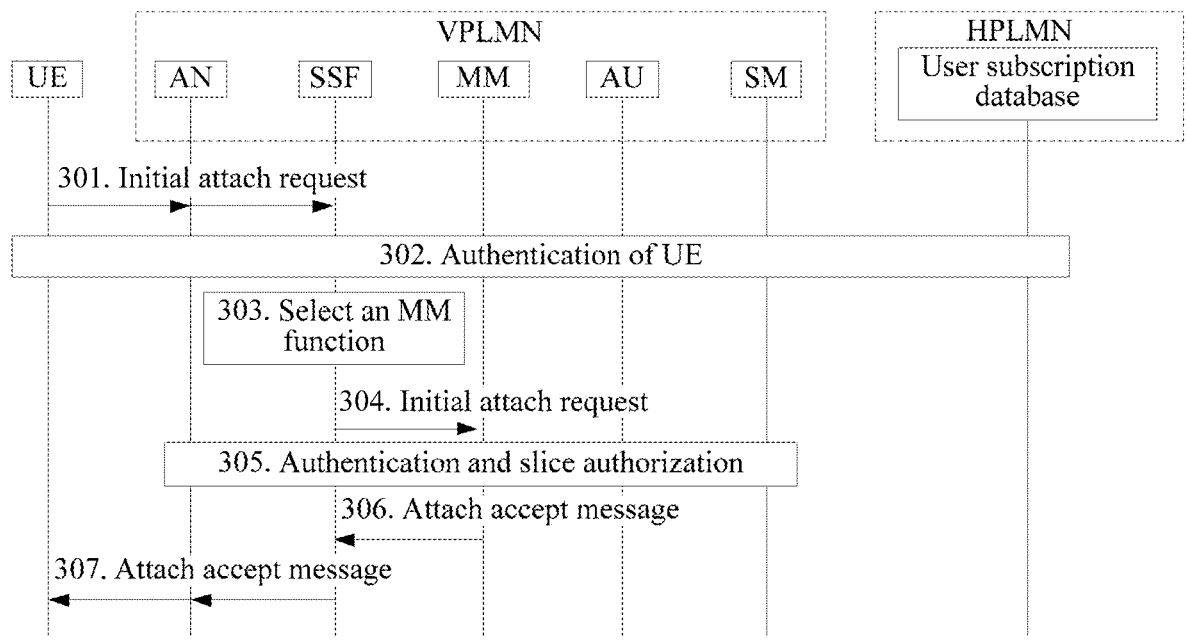
FIG. 3 is a schematic flowchart of attaching by UE according to an embodiment of the present disclosure.

In this embodiment of the present disclosure, the first service request message sent by the UE and received by the first SSF device of the VPLMN may be an attach request of the UE that carries a requested service type, and is used to request to register with a network and request the network to establish a session connection for the service. The attach request may be alternatively sent before the first SSF device of the VPLMN receives the first service request message sent by the UE. For an initial attach procedure in which the UE attaches to the VPLMN, refer to FIG. 3.

Step 301. The UE sends an initial attach request message to request to register with a network.

Step 302. A first SSF device receives the initial attach request message forwarded by an access network (AN), and queries subscription information of the UE from a user subscription database of an HPLMN of the UE based on an international mobile subscriber identity IMSI of the UE, to complete authentication of the UE.

Step 303. The first SSF device determines, based on the subscription information, information carried in the initial attach request message, and an HPLMN ID or indication information indicating that the UE is a roaming subscriber, a mobility management MM function required by the UE.

Step 304. The first SSF device sends the initial attach request message to the MM function.

Step 305. The MM function selects an authentication and authorization AU function to perform an authentication and slice authorization process.

Step 306. The MM function sends an attach accept message to the first SSF device, where the attach accept message carries a temporary identifier (ID) of the UE.

Step 307. The SSF device forwards the attach accept message to the UE by using the AN.

In this embodiment of the present disclosure, the first service request message sent by the UE and received by the first SSF device of the VPLMN may be alternatively a session establishment request message, and is used to request the network to establish a session connection for a service requested by the UE.

In this embodiment of the present disclosure, the first network slice instance is selected in the VPLMN, and the second network slice instance is selected in the HPLMN. The first network slice instance and the second network slice instance jointly provide a service for the UE by interaction between various functions in the VPLMN and the HPLMN. Selection of the first network slice instance and the second network slice instance and an interaction process are described in detail below by using four embodiments.

Embodiment 1

Figure 4:
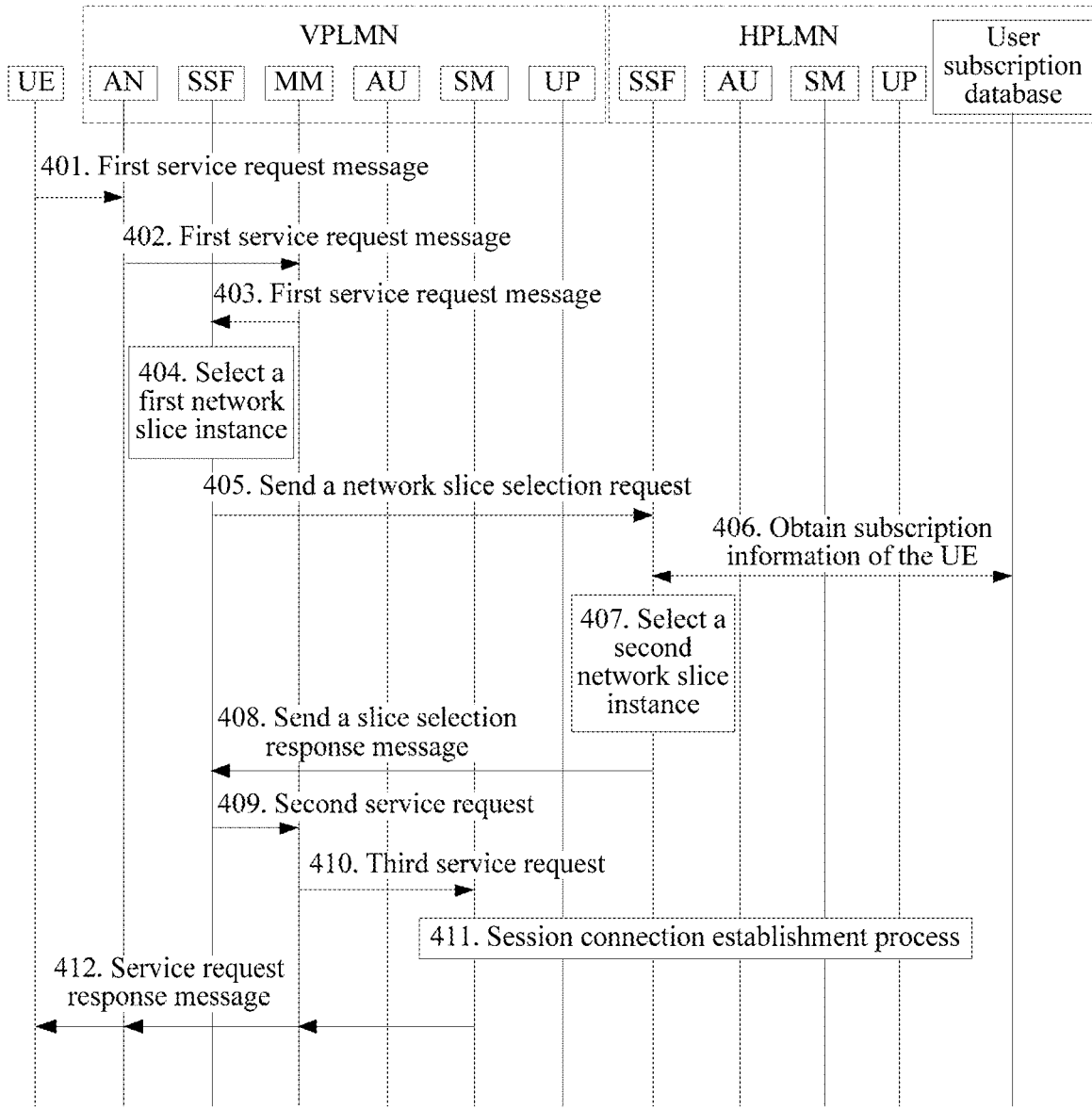
FIG. 4 is a schematic flowchart of another network slice instance selection method according to an embodiment of the present disclosure.

When a VPLMN directly sends a network slice selection request to a second SSF device of an HPLMN by using a first SSF device, a process of interaction between the VPLMN and the HPLMN is shown in FIG. 4.

Step 401. UE sends a first service request message to an AN node of a VPLMN, where the first service request message includes at least an identifier of the UE, a service type, or an access point name (APN), and the identifier of the UE may be a temporary identifier of the UE or an IMSI of the UE.

Step 402. The AN node forwards the first service request message to an MM function of the VPLMN based on the identifier of the UE.

Step 403. The MM function forwards the first service request message to a first SSF device of the VPLMN, indicates to the SSF device of the VPLMN that a service requested by the UE is of a home-routed type, determines, based on subscription data of the UE, that the UE is a roaming subscriber, and determines, based on the service type or the APN, that a service type requested by the UE is of the home-routed type.

Step 404. The first SSF device selects a first network slice instance in the VPLMN for the UE based on roaming information of the UE, where the roaming information of the UE includes: indication information indicating that the UE is a roaming subscriber and/or a home public land mobile network identifier HPLMN ID of the UE. The selecting, by the first SSF device, a first network slice instance in the VPLMN for the UE based on roaming information of the UE includes: determining, by the first SSF device, a slice type of the first network slice instance in the VPLMN for the UE based on the roaming information of the UE; or determining the first network slice instance in the VPLMN for the UE based on the roaming information of the UE; or determining the first network slice instance and a network function in the first network slice instance in the VPLMN for the UE based on the roaming information of the UE. The network function in the first network slice instance includes a mobility management MM function and/or a first session management SM function.

Step 405. The first SSF device of the VPLMN sends a network slice selection request to a second SSF device of an HPLMN, where the network slice selection request carries the service type (or the APN) requested by the UE, the identifier of the UE, and the slice type of the first network slice instance, the network slice selection request further optionally carries a VPLMN ID, and the identifier of the UE is the IMSI of the UE.

Step 406. The second SSF device of the HPLMN obtains subscription information of the UE from a user subscription database.

Step 407. The second SSF device of the HPLMN selects a second network slice instance for the UE based on information about a visited network of the UE, where the information about the visited network includes the slice type of the first network slice instance and/or the visited public land mobile network identifier VPLMN ID. The selecting, by the second SSF device, a second network slice instance in the HPLMN for the UE based on information about a visited network of the UE includes: determining, by the second SSF device, the second network slice instance for the UE based on the information about the visited network of the UE, or determining the second network slice instance and a network function in the second network slice instance for the UE based on the information about the visited network of the UE. The network function in the second network slice instance includes a second session management SM function.

Step 408. The SSF device of the HPLMN sends a slice selection response message to the SSF device of the VPLMN, where the slice selection response message includes information about the second network slice instance selected in the HPLMN for the UE by the second SSF device, the information about the second network slice instance includes: a slice type of the second network slice instance and/or an ID of the second network slice instance and/or an identifier of a second SM function of the second network slice instance, the information about the second network slice instance is used to instruct a first SM function in the first network slice instance to address the second SM function in the second network slice instance and interact with the second SM function to establish a session connection, and the identifier of the second SM function may be an IP address of the second SM function.

Step 409. The first SSF device of the VPLMN sends a second service request message to a first MM function of the VPLMN, where the second service request message includes at least the identifier of the UE, the ID of the first network slice instance or the slice type of the first network slice instance, and the information about the second network slice instance, the information about the second network slice instance includes: the slice type of the second network slice instance and/or the ID of the second network slice instance and/or the identifier of the second SM function corresponding to the second network slice instance, and the identifier of the UE may be a temporary identifier of the UE. Optionally, the second service request message further includes the HPLMN ID, and the second service request message further includes an identifier of the first SM function of the first network slice instance.

Step 410. The first MM function of the VPLMN sends a third service request message to the first SM function corresponding to the first network slice instance of the VPLMN, where the third service request message includes at least the identifier of the UE, and the slice type of the second network slice instance and/or the ID of the second network slice instance and/or the identifier of the second SM function corresponding to the second network slice instance, and the identifier of the UE may be a temporary identifier of the UE. Optionally, the third service request message further includes the HPLMN ID.

Step 411. The first SM function of the VPLMN addresses the corresponding second SM function of the HPLMN based on the slice type of the second network slice instance of the HPLMN and/or the ID of the second network slice instance and/or the identifier of the second SM corresponding to the second network slice instance, sends a session establishment request to the second SM function, and interacts with the second SM function to complete a session establishment process. Optionally, the corresponding second SM function may be addressed based on the first SM function. Alternatively, the corresponding second SM function is addressed based on the HPLMN ID and the slice type of the second network slice instance of the HPLMN, based on the HPLMN ID and ID information of the second network slice instance of the HPLMN, or based on the HPLMN ID and the identifier of the second SM function of the second network slice instance.

Step 412. The first SM function of the VPLMN returns a service request response message to the first MM function of the VPLMN, and the first MM function of the VPLMN forwards the service request response message to the UE by using an AN.

In the present disclosure, a network slice type of a network slice instance refers to information such as a network slice type identifier that can identify or indicate a slice type of the network slice instance.

Embodiment 2

Figure 5:
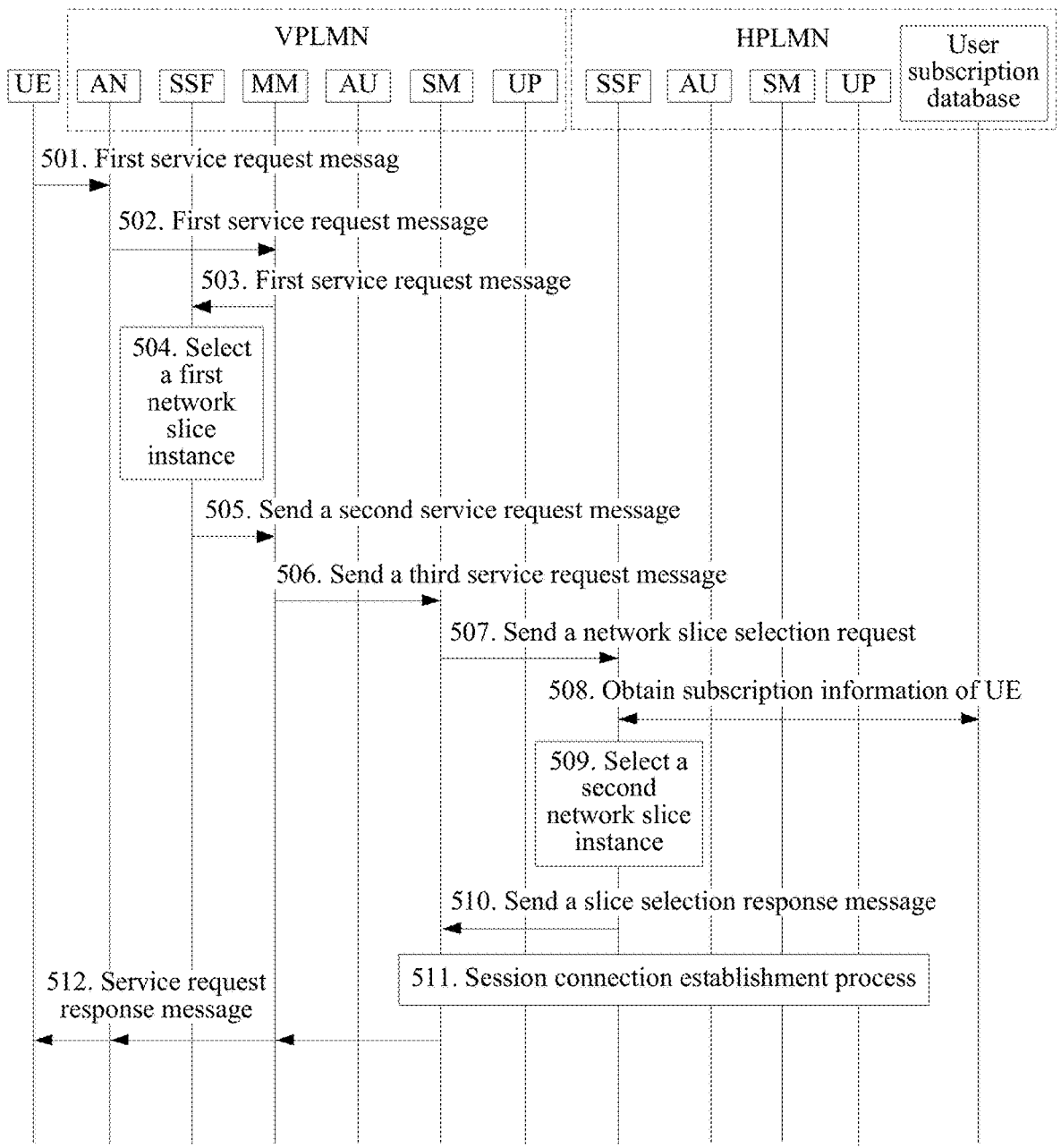
FIG. 5 is a schematic flowchart of another network slice instance selection method according to an embodiment of the present disclosure.

When a VPLMN sends a network slice selection request to a second SSF device of an HPLMN by using a first SM, a process of interaction between the VPLMN and the HPLMN is shown in FIG. 5.

Step 501. UE sends a first service request message to an AN node of a VPLMN, where the first service request message includes at least an identifier of the UE, a service type, or an APN, and the identifier of the UE may be a temporary identifier of the UE or an IMSI of the UE.

Step 502. The AN node forwards the first service request message to an MM function of the VPLMN based on the identifier of the UE.

Step 503. The MM function forwards the first service request message to a first SSF device of the VPLMN, indicates to the SSF device of the VLPMN that a service requested by the UE is of a home-routed type, determines, based on subscription data of the UE, that the UE is a roaming subscriber, and determines, based on the service type or the APN, that a service type requested by the UE is of the home-routed type.

Step 504. The first SSF device selects a first network slice instance in the VPLMN for the UE based on roaming information of the UE, where the roaming information of the UE includes: indication information indicating that the UE is a roaming subscriber and/or an HPLMN ID of the UE. The selecting, by the first SSF device, a first network slice instance in the VPLMN for the UE based on roaming information of the UE includes: determining, by the first SSF device, a slice type of the first network slice instance in the VPLMN for the UE based on the roaming information of the UE; or determining the first network slice instance in the VPLMN for the UE based on the roaming information of the UE; or determining the first network slice instance and a network function in the first network slice instance in the VPLMN for the UE based on the roaming information of the UE. The network function in the first network slice instance includes a mobility management MM function and/or a first session management SM function.

Step 505. The first SSF device of the VPLMN sends a second service request message to a first MM function of the VPLMN, where the second service request message carries at least the service type (or the APN) requested by the UE, the identifier of the UE, and the slice type of the first network slice instance or an ID of the first network slice instance, and the identifier of the UE may be a temporary identifier of the UE. Optionally, the second service request message further includes the HPLMN ID. Optionally, the second service request message further includes an identifier of a first SM function of the first network slice instance.

Step 506. The first MM function of the VPLMN sends a third service request message to the first SM function of the VPLMN, where the third service request message is used to request a first service and instruct the first SM function to establish a session connection for the first service. The third service request message includes at least the identifier of the UE, and the identifier of the UE may be a temporary identifier of the UE. Optionally, the third service request message further includes: the ID of the first network slice instance and/or the slice type of the first network slice instance. When the selecting, by the first SSF device, a first network slice instance in the VPLMN for the UE based on roaming information of the UE in step 504 includes: determining, by the first SSF device, the slice type of the first network slice instance in the VPLMN for the UE based on the roaming information of the UE, before performing the sending, by the first MM function, a third service request message to the first SM function in step 506, the method further includes: determining, by the first MM function, the first network slice instance and the first SM function in the first network slice instance based on the slice type of the first network slice instance that is determined by the first SSF device.

Step 507. The first SM function of the VPLMN sends a network slice selection request to a second SSF device of an HPLMN, where the network slice selection request carries at least the slice type of the first network slice instance, the service type (or the APN) requested by the UE, and the identifier of the UE, the identifier of the UE may be the IMSI of the UE, and the network slice selection request further optionally carries a VPLMN ID.

Step 508. The second SSF device of the HPLMN obtains subscription information of the UE from a user subscription database.

Step 509. The second SSF device of the HPLMN selects a second network slice instance for the UE based on information about a visited network of the UE, where the information about the visited network includes the slice type of the first network slice instance and/or the VPLMN ID. The selecting, by the second SSF device, the first network slice instance for the UE based on information about a visited network of the UE includes: determining a slice type of the second network slice instance for the UE based on the information about the visited network of the UE, or determining the second network slice instance for the UE based on the information about the visited network of the UE, or determining the second network slice instance and a network function in the second network slice instance for the UE based on the information about the visited network of the UE. The network function in the second network slice instance includes a second session management SM function.

Step 510. The SSF device of the HPLMN sends a slice selection response message to the first SM of the VPLMN, where the slice selection response message includes information about the second network slice instance selected in the HPLMN for the UE by the second SSF device, the information about the second network slice instance includes: a slice type of the second network slice instance and/or an ID of the second network slice instance and/or an identifier of a second SM function of the second network slice instance, the information about the second network slice instance is used to instruct a first SM function in the first network slice instance to address the second SM function in the second network slice instance and interact with the second SM function to establish a session connection, and the identifier of the second SM function may be an IP address of the second SM function.

Step 511. The first SM function of the VPLMN addresses the corresponding second SM function of the HPLMN based on the slice type of the second network slice instance of the HPLMN and/or the ID of the second network slice instance and/or the identifier of the second SM corresponding to the second network slice instance, sends a session establishment request to the second SM function, and interacts with the second SM function to complete a session establishment process. Optionally, the corresponding second SM function may be addressed based on the first SM function. Alternatively, the corresponding second SM function may be addressed based on the HPLMN ID and the slice type of the second network slice instance of the HPLMN, based on the HPLMN ID and ID information of the second network slice instance of the HPLMN, or based on the HPLMN ID and the identifier of the second SM function of the second network slice instance.

Step 512. The first SM function of the VPLMN returns a service request response message to the first MM function of the VPLMN, and the first MM function of the VPLMN forwards the service request response message to the UE by using the AN.

Embodiment 3

Figure 6:
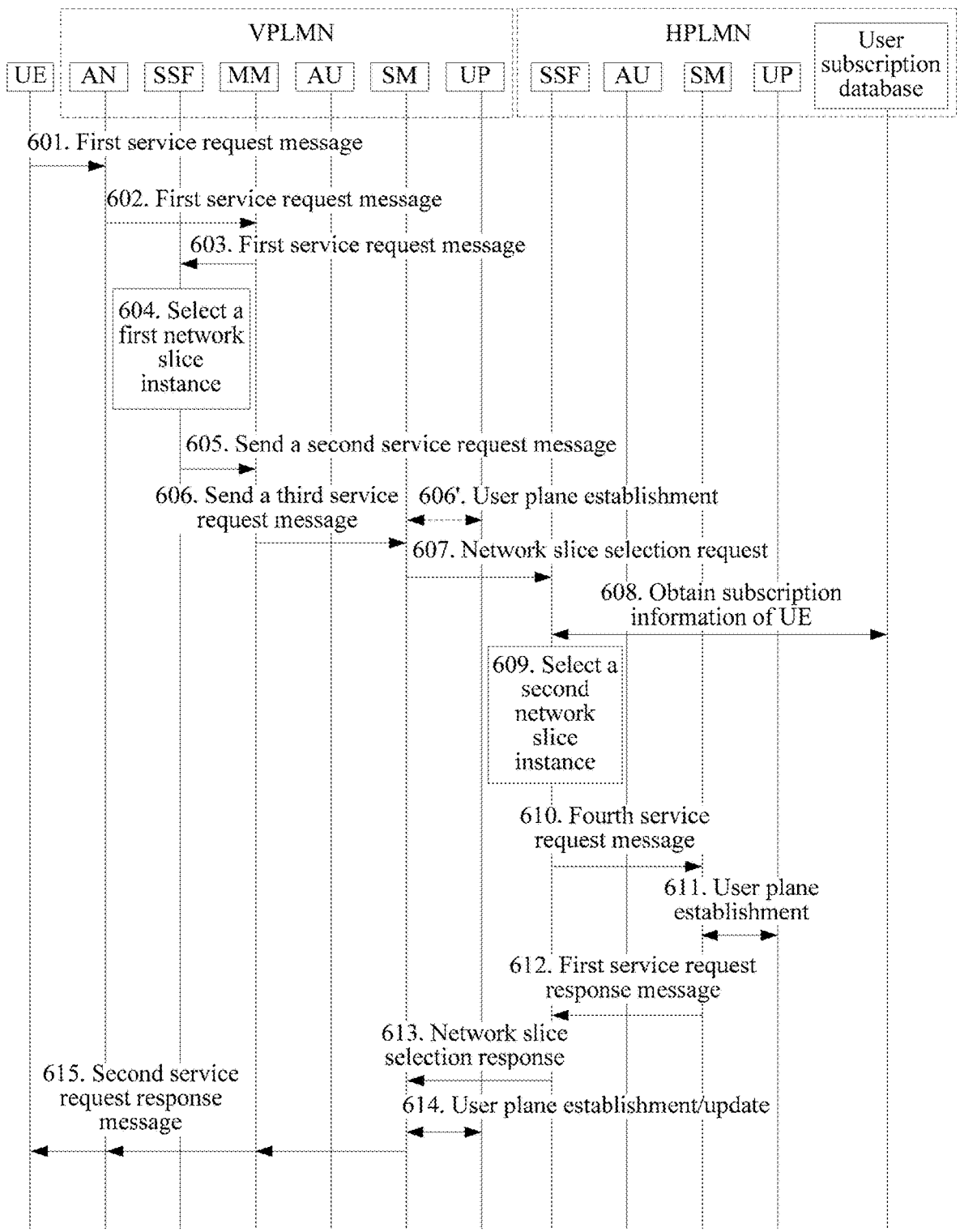
FIG. 6 is a schematic flowchart of another network slice instance selection method according to an embodiment of the present disclosure.

When a VPLMN sends a network slice selection request to a second SSF device of an HPLMN by using a first SM, another process of interaction between the VPLMN and the HPLMN is shown in FIG. 6.

Step 601. UE sends a first service request message to an AN node of a VPLMN, where the first service request message includes at least an identifier of the UE, a service type, or an APN, and the identifier of the UE may be a temporary identifier of the UE or an IMSI of the UE.

Step 602. The AN node forwards the first service request message to an MM function of the VPLMN based on the identifier of the UE.

Step 603. The MM function forwards the first service request message to a first SSF device of the VPLMN, indicates to the SSF device of the VLPMN that a service requested by the UE is of a home-routed type, determines, based on subscription data of the UE, that the UE is a roaming subscriber, and determines, based on the service type or the APN, that a service type requested by the UE is of the home-routed type.

Step 604. The first SSF device selects a first network slice instance in the VPLMN for the UE based on roaming information of the UE, where the roaming information of the UE includes: indication information indicating that the UE is a roaming subscriber and/or a home public land mobile network identifier HPLMN ID of the UE. The selecting, by the first SSF device, a first network slice instance in the VPLMN for the UE based on roaming information of the UE includes: determining, by the first SSF device, a slice type of the first network slice instance in the VPLMN for the UE based on the roaming information of the UE; or selecting the first network slice instance in the VPLMN for the UE based on the roaming information of the UE; or selecting the first network slice instance and a network function in the first network slice instance in the VPLMN for the UE based on the roaming information of the UE. The network function in the first network slice instance includes a mobility management MM function and/or a first session management SM function.

Step 605. The first SSF device of the VPLMN sends a second service request message to a first MM function of the VPLMN, where the second service request message carries at least the service type (or the APN) requested by the UE, the identifier of the UE, and the slice type of the first network slice instance or an ID of the first network slice instance. Optionally, the second service request message further includes the HPLMN ID, the second service request message further includes an identifier of the first SM function of the first network slice instance, and the identifier of the UE may be a temporary identifier of the UE.

Step 606. The first MM function of the VPLMN sends a third service request message to the first SM function of the VPLMN, where the third service request message is used to request a first service and instruct the first SM function to establish a session connection for the first service. The third service request message includes at least the identifier of the UE, and the identifier of the UE may be a temporary identifier of the UE. Optionally, the third service request message further includes: the ID of the first network slice instance and/or the slice type of the first network slice instance. When the selecting, by the first SSF device, a first network slice instance in the VPLMN for the UE based on roaming information of the UE in step 604 includes: determining, by the first SSF device, the slice type of the first network slice instance in the VPLMN for the UE based on the roaming information of the UE, before performing the sending, by the first MM function, a third service request message to the first SM function in step 606, the method further includes: determining, by the first MM function, the first network slice instance and the first SM function in the first network slice instance based on the slice type of the first network slice instance that is determined by the first SSF device.

Step 607. The first SM function of the VPLMN sends a network slice selection request to a second SSF device of an HPLMN, where the network slice selection request carries the slice type of the first network slice instance, the service type (or the APN) requested by the UE, and an identifier of the UE (IMSI), and the identifier of the UE may be the IMSI of the UE. Optionally, the network slice selection request further carries a VPLMN ID. Optionally, the network slice selection request further carries the ID of the first network slice instance and/or the identifier of the first SM function in the first network slice instance, and an identifier of a user plane function in the first network slice instance, the identifier of the first SM function may be an IP address of the first SM function, and the identifier of the user plane function in the first network slice instance may be an IP address of the user plane function. The identifier of the UE may be the IMSI of the UE. Optionally, the network slice selection request further carries the VPLMN ID.

Step 608. The second SSF device of the HPLMN obtains subscription information of the UE from a user subscription database.

Step 609. The second SSF device of the HPLMN selects a second network slice instance for the UE based on information about a visited network of the UE, where the information about the visited network includes the slice type of the first network slice instance and/or the VPLMN ID. The selecting, by the second SSF device, the first network slice instance for the UE based on information about a visited network of the UE includes: determining a slice type of the second network slice instance for the UE based on the information about the visited network of the UE, or determining the second network slice instance for the UE based on the information about the visited network of the UE, or determining the second network slice instance and a network function in the second network slice instance for the UE based on the information about the visited network of the UE. The network function in the second network slice instance includes a second session management SM function.

Step 610. The second SSF device of the HPLMN sends a fourth service request message to a second SM function of the HPLMN, where the fourth service request message is used to request a first service and instruct the second SM function to establish a session connection for the first service. The fourth service request message includes at least the identifier of the UE, the VPLMN ID, and the ID of the first network slice instance and/or the identifier of the first SM function in the first network slice instance, and the identifier of the UE may be the temporary identifier of the UE.

Step 611. The second SM function of the HPLMN completes user plane establishment of a home network, where a message transferred to a user plane function of the home network includes the identifier of the user plane function in the first network slice instance. Optionally, the message transferred to the user plane function of the home network further includes the ID of the first network slice instance of the VPLMN or the identifier of the first SM function corresponding to the first network slice instance.

Step 612. The second SM function of the HPLMN sends a first service response message to the second SSF device of the HPLMN, where the first service response message carries an identifier of a user plane function in the second network slice instance.

Step 613. The second SSF device of the HPLMN sends a slice selection response message to the first SM of the VPLMN, where the slice selection response message includes information about the second network slice instance selected in the HPLMN for the UE by the second SSF device, and the information about the second network slice instance is used to instruct the first SM function in the first network slice instance to address the second SM function in the second network slice instance. The information about the second network slice instance includes: the identifier of the user plane function in the second network slice instance. The identifier of the user plane function in the second network slice instance may be an IP address of the user plane function. Optionally, the information about the second network slice instance further includes: the slice type of the second network slice instance and/or an ID of the second network slice instance and/or an identifier of the second SM function of the second network slice instance, and the identifier of the second SM function may be an IP address of the second SM function.

Step 614. The first SM function of the VPLMN triggers to complete visited user plane establishment, where a message transferred to a user plane function of a home network includes the identifier of the user plane function in the second network slice instance. Optionally, the message transferred to the user plane function of the home network further includes the ID of the second network slice instance of the HPLMN or the identifier of the second SM function corresponding to the second network slice instance.

Step 615. The first SM function of the VPLMN returns a second service request response message to the first MM function of the VPLMN, and the first MM function of the VPLMN forwards the service request response message to the UE by using an AN.

Optionally, after step 606 and before step 607, the method may further include:

Step 606'. The first SM function of the VPLMN chooses to trigger to complete visited user plane establishment, where a message transferred to a user plane function includes a QoS requirement of a session connection to be established. If this step exists, in step 614, the first SM function of the VPLMN updates a user plane.

Embodiment 4

Figure 7:
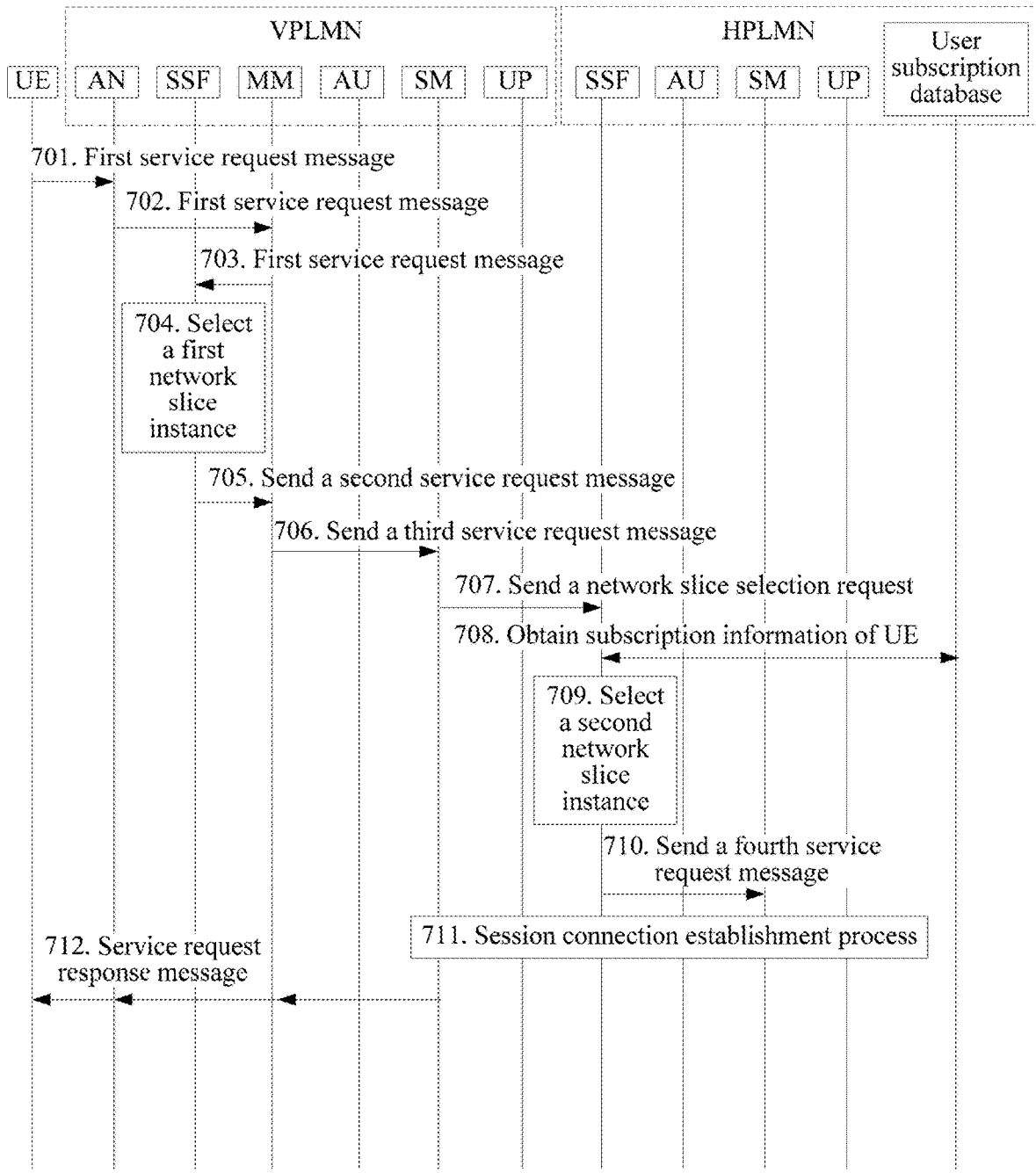
FIG. 7 is a schematic flowchart of another network slice instance selection method according to an embodiment of the present disclosure.

When a VPLMN sends a network slice selection request to a second SSF device of an HPLMN by using a first SM, another process of interaction between the VPLMN and the HPLMN is shown in FIG. 7.

Steps 701 to 706 are the same as the foregoing steps 601 to 606.

Step 707. The first SM function of the VPLMN sends a network slice selection request to a second SSF device of an HPLMN, where the network slice selection request carries the slice type of the first network slice instance, the service type (or the APN) requested by the UE, and an IMSI of the identifier of the UE, and the identifier of the UE may be an IMSI of the UE. Optionally, the network slice selection request further carries a VPLMN ID. Optionally, the network slice selection request further carries the ID of the first network slice instance and/or the identifier of the first SM function in the first network slice instance. The ID of the first network slice instance and/or the identifier of the first SM function in the first network slice instance are used to instruct the second SM function in the second network slice instance to address the first SM function and interact with the first SM function to establish a session connection. The identifier of the first SM function may be an IP address of the first SM function. The identifier of the UE may be the IMSI of the UE. Optionally, the network slice selection request further carries the VPLMN ID.

Step 708. The second SSF device of the HPLMN obtains subscription information of the UE from a user subscription database.

Step 709. The second SSF device of the HPLMN selects a second network slice instance for the UE based on information about a visited network of the UE, where the information about the visited network includes the slice type of the first network slice instance and/or the VPLMN ID. The selecting, by the second SSF device, the first network slice instance for the UE based on information about a visited network of the UE includes: determining a slice type of the second network slice instance for the UE based on the information about the visited network of the UE, or determining the second network slice instance for the UE based on the information about the visited network of the UE, or determining the second network slice instance and a network function in the second network slice instance for the UE based on the information about the visited network of the UE. The network function in the second network slice instance includes a second session management SM function.

Step 710. The second SSF device of the HPLMN sends a fourth service request message to a second SM function of the HPLMN, where the fourth service request message is used to request a first service and instruct the second SM function to establish a session connection for the first service. The fourth service request message includes at least the identifier of the UE, the VPLMN ID, and the ID of the first network slice instance and/or the identifier of the first SM function in the first network slice instance, and the identifier of the UE may be a temporary identifier of the UE.

Step 711. The second SM function of the HPLMN addresses the corresponding first SM function of the VPLMN based on the slice type of the first network slice instance of the VPLMN or the ID of the first network slice instance or the identifier of the first SM function corresponding to the first network slice instance, sends a session establishment request to the first SM function, and interacts with the first SM function to complete a session establishment process. The session establishment request includes the slice selection response message. Optionally, the corresponding first SM function may be addressed based on the second SM function, based on the VPLMN ID and the slice type of the first network slice instance of the VPLMN, based on the VPLMN ID and ID information of the first network slice instance of the VPLMN, or based on the VPLMN ID and the identifier of the first SM function corresponding to the first network slice instance.

Step 712. The first SM function of the VPLMN returns a service request response message to the first MM function of the VPLMN, and the first MM function of the VPLMN forwards the service request response message to the UE by using the AN.

Figure 8:
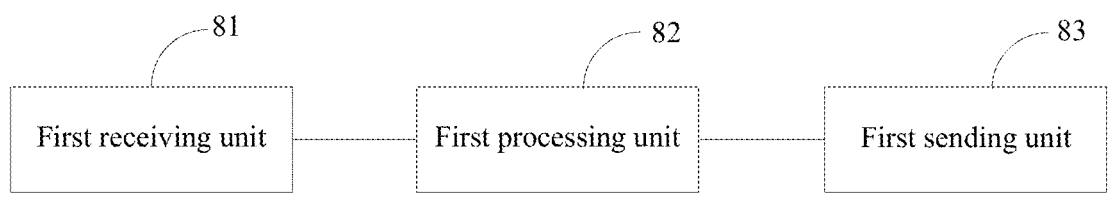
FIG. 8 is a schematic structural diagram of a network slice instance selection apparatus according to an embodiment of the present disclosure.

Based on the same inventive idea, an embodiment of the present disclosure provides a network slice instance selection apparatus. As shown in FIG. 8, the apparatus includes:

a first receiving unit 81, configured to receive a first service request message sent by UE; and a first processing unit 82, configured to: obtain roaming information of user equipment UE according to the first service request message received by the first receiving unit, and select a first network slice instance in a VPLMN for the UE based on the roaming information of the UE.

Optionally, the apparatus further includes a first sending unit 83. The first sending unit 83 is configured to send a network slice selection request to a second SSF device of an HPLMN. The first receiving unit 81 is further configured to receive a slice selection response message sent by the second SSF device. The network slice selection request is used to request the second SSF device of the HPLMN to select a second network slice instance in the HPLMN for the UE, the slice selection response message includes information about the second network slice instance selected in the HPLMN for the UE by the second SSF device, and the information about the second network slice instance is used to instruct a first SM function in the first network slice instance to address a second SM function and interact with the second SM function to establish a session connection.

In this embodiment of the present disclosure, the first receiving unit 81, the first processing unit 82, and the first sending unit 83 belong to a first SSF device of the VPLMN. The first SSF device may be disposed as a separate device, or may be disposed in a same device together with another function.

The first SSF device selects the first network slice instance in the VPLMN for the UE, the second SSF device selects the second network slice instance in the HPLMN for the UE, and the first network slice instance and the second network slice instance jointly provide a service for the UE.

Optionally, before receiving the first service request message sent by the UE, the first receiving unit 81 receives an attach request of the UE. The first processing unit 82 queries subscription information of the UE from a user subscription database of the HPLMN of the UE based on an international mobile subscriber identity of the UE; and determines, based on the subscription information, information carried in the attach request, and an HPLMN ID or indication information indicating that the UE is a roaming subscriber, a mobility management MM function required by the UE. The first sending unit sends an attach request message to the MM function.

Optionally, the roaming information of the UE includes: the indication information indicating that the UE is a roaming subscriber, and/or the home public land mobile network identifier HPLMN ID of the UE.

Optionally, after the first receiving unit 81 receives the first service request message, the first processing unit 82 determines a slice type of the first network slice instance in the VPLMN for the UE based on the roaming information of the UE.

Optionally, after the first receiving unit 81 receives the first service request message, the first processing unit 82 determines the first network slice instance in the VPLMN for the UE based on the roaming information of the UE.

Optionally, after the first receiving unit 81 receives the first service request message, the first processing unit 82 determines the first network slice instance and a network function in the first network slice instance in the VPLMN for the UE based on the roaming information of the UE.

In this embodiment of the present disclosure, the first network slice instance is in a specified correspondence with the network function in the first network slice instance.

Optionally, the network function in the first network slice instance includes a mobility management MM function and/or a first session management SM function.

Optionally, the network slice selection request includes: the slice type of the first network slice instance.

Optionally, the network slice selection request further includes: a visited public land mobile network identifier VPLMN ID.

Optionally, the information about the second network slice instance includes: a slice type of the second network slice instance and/or an ID of the second network slice instance and/or an identifier of the second SM function of the second network slice instance.

Figure 9:
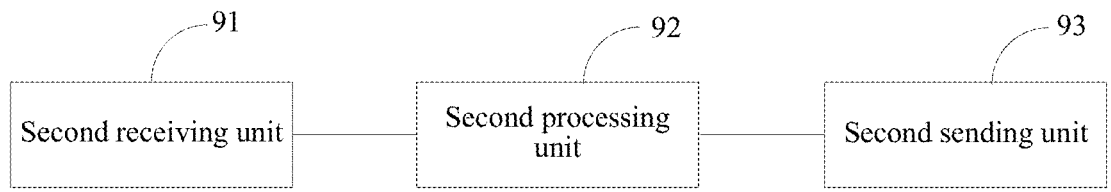
FIG. 9 is a schematic structural diagram of another network slice instance selection apparatus according to an embodiment of the present disclosure.

An embodiment of the present disclosure provides a network slice selection apparatus. As shown in FIG. 9, the apparatus includes: a second receiving unit 91, configured to receive a network slice selection request; a second processing unit 92, configured to: after the second receiving unit 91 receives the network slice selection request, select a second network slice instance in an HPLMN for the UE based on information about a visited network of the UE; and a second sending unit 93, configured to send a slice selection response message, where the slice selection response message includes information about the second network slice instance selected in the HPLMN for the UE by a second SSF device.

Optionally, the second receiving unit 91, the second processing unit 92, and the second sending unit 93 belong to the second SSF device of the HPLMN.

Optionally, the network slice selection request received by the second receiving unit 91 is sent by a first SSF device of a VPLMN.

Optionally, the network slice selection request received by the second receiving unit 91 is sent by a first SM function in a first network slice instance of a VPLMN.

Optionally, the second sending unit 93 sends the slice selection response message to the first SSF device of the VPLMN.

Optionally, the second sending unit 93 sends the slice selection response message to the first SM of the VPLMN.

Optionally, after the second receiving unit 91 receives the network slice selection request, the second processing unit 92 determines a slice type of the second network slice instance in the HPLMN for the UE based on the information about the visited network of the user equipment UE.

Optionally, after the second receiving unit 91 receives the network slice selection request, the second processing unit 92 determines the second network slice instance in the HPLMN for the UE based on the information about the visited network of the user equipment UE.

Optionally, after the second receiving unit 91 receives the network slice selection request, the second processing unit 92 determines the second network slice instance and a network function in the second network slice instance in the HPLMN for the UE based on the information about the visited network of the user equipment UE.

Optionally, the information about the visited network includes: a slice type of the first network slice instance and/or a visited public land mobile network identifier VPLMN ID.

Optionally, the network function in the second network slice instance includes a second session management SM function.

Optionally, the information about the second network slice instance includes: a slice type of the second network slice instance and/or an ID of the second network slice instance and/or an identifier of a second SM function of the second network slice instance, and the information about the second network slice instance is used to instruct the first SM function in the first network slice instance to address the second SM function in the second network slice instance and interact with the second SM function to establish a session connection.

Figure 10:
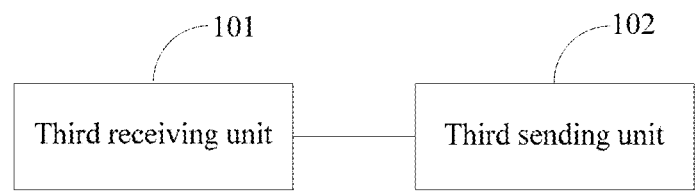
FIG. 10 is a schematic structural diagram of another network slice instance selection apparatus according to an embodiment of the present disclosure.

An embodiment of the present disclosure provides a network slice instance selection apparatus. As shown in FIG. 10, the apparatus includes: a third receiving unit 101, configured to receive a second service request message, and a third sending unit 102, configured to: after the third receiving unit 101 receives the second service request message, send a network slice selection request to a second SSF device of an HPLMN. Then, the third receiving unit 101 receives a slice selection response message sent by the second SSF device. The second service request message is used to request a first service and instruct the first SM function to establish a session connection for the first service, the network slice selection request is used to instruct the second SSF device of the HPLMN to select a second network slice instance in the HPLMN for user equipment UE, and the slice selection response message includes information about the second network slice instance selected in the HPLMN by the second SSF device.

In this embodiment of the present disclosure, the third receiving unit 101 and the third sending unit 102 belong to the first SM function of the VPLMN. The first SM function may be disposed as a separate device, or may be disposed in one device together with another function.

Optionally, the network slice selection request includes: the slice type of the first network slice instance.

Optionally, the network slice selection request further includes: a VPLMN ID.

Optionally, the network slice selection request further includes: an ID of the first network slice instance and/or an identifier of the first SM function in the first network slice instance, and the ID of the first network slice instance and/or the identifier of the first SM function in the first network slice instance is used to instruct a second SM function in the second network slice instance to address the first SM function and interact with the first SM function to establish a session connection.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

The invention claimed is:

1. A communications system, comprising:
a mobility management function device of a visited public land mobile network (VPLMN), configured to send a message comprising a home public land mobile network identifier (HPLMN ID) of a user equipment (UE) and an indication indicating that a requested service is of a home-routed type; and
a first slice selection function device of the VPLMN, configured to:
receive the message from the mobility management function device;
select a first network slice instance in the VPLMN for the UE based on the message comprising the HPLMN ID of the UE;
send network slice selection request information to a second slice selection function device of a home public land mobile network (HPLMN) of the UE;
receive slice selection response information from the second slice selection function device, wherein the slice selection response information comprises an identifier of a second network slice instance in the HPLMN for the UE; and
send an identifier of the first network slice instance in the VPLMN and the identifier of the second network slice instance in the HPLMN to the mobility management function device.

2. The system according to claim 1, wherein the first slice selection function device is configured to determine a slice type of the first network slice instance in the VPLMN for the UE based on the message comprising the HPLMN ID of the UE.

3. The system according to claim 1, wherein the first slice selection function device is further configured to determine a network function in the first network slice instance in the VPLMN for the UE based on the message comprising the HPLMN ID of the UE.

4. The system according to claim 1, wherein the network slice selection request information comprises a slice type of the first network slice instance.

5. The system according to claim 1, wherein the network slice selection request information further comprises a visited public land mobile network identifier (VPLMN ID).

6. The system according to claim 1, further comprising the second slice selection function device, wherein the second slice selection function device, configured to:
receive the network slice selection request information; and
send the slice selection response information to the first slice selection function device.

7. The system according to claim 1, further comprising the second slice selection function device, wherein the second slice selection function device is configured to select the second network slice instance in the HPLMN for the UE.

8. A communications apparatus of a visited public land mobile network (VPLMN), comprising:
a processor; and
a memory coupled to the processor, wherein the memory comprises instructions that, when executed by the processor, configures the communications apparatus to perform operations comprising:
receiving a message comprising a home public land mobile network identifier (HPLMN ID), and an indication indicating that a requested service is of a home-routed type from a mobility management function device that belongs to the VPLMN;
selecting a first network slice instance in the VPLMN for a user equipment (UE) based on the message comprising the HPLMN ID of the UE;
sending network slice selection request information to a second slice selection function device of a home public land mobile network (HPLMN) of the UE;
receiving slice selection response information from the second slice selection function device, wherein the slice selection response information comprises an identifier of a second network slice instance, in the HPLMN for the UE; and
sending an identifier of the first network slice instance in the VPLMN and the identifier of the second network slice instance in the HPLMN to the mobility management function device.

9. The communications apparatus according to claim 8, wherein the operations further comprise:
determining a slice type of the first network slice instance in the VPLMN for the UE based on the message comprising the HPLMN ID of the UE.

10. The communications apparatus according to claim 8, wherein the operations further comprise:

determining a network function in the first network slice instance in the VPLMN for the UE based on the message comprising the HPLMN ID of the UE.

11. The communications apparatus according to claim 8, wherein the network slice selection request information comprises a slice type of the first network slice instance.

12. The communications apparatus according to claim 8, wherein the network slice selection request information further comprises a visited public land mobile network identifier (VPLMN ID).

13. A communications method, comprising:
receiving, by a first slice selection function device of a visited public land mobile network (VPLMN), a message comprising a home public land mobile network identifier (HPLMN ID), and an indication indicating that a requested service is of a home-routed type from a mobility management function device of the VPLMN;
selecting a first network slice instance in the VPLMN for a user equipment (UE) based on the message comprising the HPLMN ID of the UE;
sending, by the first slice selection function device, network slice selection request information to a second slice selection function device of a home public land mobile network (HPLMN) of the UE;
receiving, by the first slice selection function device, slice selection response information from the second slice selection function device, wherein the slice selection response information comprises an identifier of a second network slice instance in the HPLMN for the UE; and
sending an identifier of the first network slice instance in the VPLMN and the identifier of the second network slice instance in the HPLMN to the mobility management function device.

14. The communications method according to claim 13, further comprising:
determining, by the first slice selection function device, a slice type of the first network slice instance in the VPLMN for the UE based on the message comprising the HPLMN ID of the UE.

15. The communications method according to claim 13, further comprising:
determining, by the first slice selection function device, a network function in the first network slice instance in the VPLMN for the UE based on the message comprising the HPLMN ID of the UE.

16. The communications method according to claim 15, wherein the network function is a mobility management function.

17. The communications apparatus according to claim 10, wherein the network function is a mobility management function.

18. The system according to claim 3, wherein the network function is a mobility management function.

* * * * *